(12) United States Patent
Soga et al.

(10) Patent No.: US 7,160,934 B2
(45) Date of Patent: Jan. 9, 2007

(54) INK FOR INK-JET RECORDING, AND INK CARTRIDGE AND RECORDING APPARATUS INCLUDING THE SAME

(75) Inventors: Mamoru Soga, Osaka (JP); Masaichiro Tatekawa, Osaka (JP); Hiroyuki Matsuo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 234 days.

(21) Appl. No.: 10/622,030

(22) Filed: Jul. 17, 2003

(65) Prior Publication Data

US 2004/0087679 A1  May 6, 2004

Related U.S. Application Data

(63) Continuation-in-part of application No. 09/929,728, filed on Aug. 14, 2001, now abandoned.

(30) Foreign Application Priority Data

Aug. 28, 2000 (JP) .............................. 2000-257259

(51) Int. Cl.
*C09D 11/10* (2006.01)
*C08L 53/00* (2006.01)
*C08L 71/00* (2006.01)

(52) U.S. Cl. ...................... 523/160; 524/505; 524/612

(58) Field of Classification Search ................ 523/160, 523/161; 524/505; 106/31.6, 31.28
See application file for complete search history.

(56) References Cited

U.S. PATENT DOCUMENTS

| 5,371,147 A | 12/1994 | Spinelli et al. |
| 5,531,818 A * | 7/1996 | Lin et al. .................. 106/31.28 |
| 5,772,741 A | 6/1998 | Spinelli |
| 5,874,974 A * | 2/1999 | Courian et al. ................ 347/65 |
| 6,150,468 A | 11/2000 | Schoenberg et al. |
| 6,201,099 B1 | 3/2001 | Petersen et al. |
| 6,336,966 B1 | 1/2002 | Coca et al. |
| 6,420,479 B1 | 7/2002 | Phan et al. |
| 6,436,178 B1 | 8/2002 | Hosmer |

FOREIGN PATENT DOCUMENTS

| EP | 556649 A1 * | 8/1993 |
| EP | 1008634 A1 | 6/2000 |
| JP | 10-140055 | 5/1998 |
| JP | 2000-154341 | 6/2000 |

OTHER PUBLICATIONS

Kanaoka, Shokyoku, Sawamoto, Mitsuo, and Higashimura, Toshinobu; "Star-Shaped Polymers by Living Cationic Polymerization. 2. Synthesis of Amphiphilic Star-Shaped Block Polymers of Vinyl Ethers with Hydroxyl Groups", Macromolecules 24(21) 5741-5745 (1991).*

(Continued)

*Primary Examiner*—Callie Shosho
(74) *Attorney, Agent, or Firm*—Harness, Dickey & Pierce, P.L.C.

(57) ABSTRACT

Ink for ink-jet recording contains an oil soluble dye, a humectant, a penetrant, water, and an amphiphilic star block polymer of which the outer portion is hydrophilic. The surface tension of the ink at 25° C. is in the range of 20 to 50 mN/m.

9 Claims, 6 Drawing Sheets

OTHER PUBLICATIONS

Kanaoka, Shokyoku, Nakata, Satoru, and Yamaoka, Hitoshi; "Amphiphilic Heteroarm Star-Shaped Polymers by Living Cationic Polymerization: A Unique Behavior in Aqueous Solution", Macromolecules 35(12) 4564-4566 (2002).*

Kanaoka, Shokyoku; Sawamoto, Mitsuo; and Higashimura, Toshinobu; "Star-Shaped Polymers by Living Cationic Polymerization. 2. Synthesis of Amphiphilic Star-Shaped Block Polymers of Vinyl Ethers with Hydroxyl Groups"; Macromolecules; vol. 24, No. 21; Oct. 1991; pp. 5741-5745.

Kanaoka, Shokyoku; Omura, Takahiro; Sawamoto, Mitsuo; and Higashimura, Toshinobu; "Star-Shaped Polymers by Living Cationic Polymerization. 3. Synthesis of Heteroarm Amphiphilic Star-Shaped Polymers of Vinyl Ethers with Hydroxyl or Carboxyl Pendant Groups"; Macromolecules; vol. 25, No. 24; 1992; pp. 6407-3413.

Kanaoka, S. Kiriyama, K.; and Higashimura, T.; "Synthesis and Functins of Amphiphilic Star Block and Heteroarm Star Polymers by Living Cationic Polymerization"; Prepr. 7th SPSJ International Polymer Conference (IPC 99); 1999; p. 235.

Kanaoka, S.; "Precision Synthesis of Functional Star-Shaped Polymers by Living Cationic Polymerization"; Polymer Preprints, Japan, vol. 49, No. 1; 2000; and partial English translation thereof.

* cited by examiner

INK FOR INK-JET RECORDING, AND INK CARTRIDGE AND RECORDING APPARATUS INCLUDING THE SAME

CROSS-REFERENCE TO RELATED APPLICATIONS

This is a Continuation-In-Part application of application Ser. No. 09/929,728, filed Aug. 14, 2001, which is now abandoned.

BACKGROUND OF THE INVENTION

The present invention relates to ink suitable for ink-jet recording, and an ink cartridge and a recording apparatus including such ink.

Conventionally, as the ink used for ink-jet recording, ink containing a coloring material (e.g. dye and pigment), a humectant, a penetrant, and water is well known. The humectant is contained for preventing drying of the ink in an ink-jet head. The penetrant is contained for improving the penetration of the ink into recording paper.

As the dye, water-soluble dye is often used. However, to enhance, for example, water resistance on recording paper, oil soluble dye is preferably used. As ink using an oil soluble dye, known is ink essentially composed of an oil soluble dye, polyoxyethylene oxypropylenetriol, and an aqueous acrylic resin solution or a water-soluble acrylic resin emulsion (see Japanese Laid-Open Patent Publication No. 10-140055). Also known is ink composed of a colored emulsion where a polymer obtained from a dye composition of a monomer composition blended with an oil soluble dye is dispersed in a water-type medium (see Japanese Laid-Open Patent Publication No. 2000-154341).

There is also proposed a technique for dissolving an intrinsically water-insoluble oil soluble dye in water using, as an additive, an amphiphilic star block polymer or an amphiphilic heteroarm star polymer (Polymer Preprints, Japan Vol. 49, No. 1 (2000) pp. 22–24, Macromolecules, Vol. 24, No. 21 (1991) pp. 5741–5745, Macromolecules, Vol. 25, No. 24 (1992) pp. 6407–6413).

Ink used for ink-jet recording must be low in viscosity to some extent. If the viscosity is too high, the ink fails to fly from a nozzle of an ink-jet head as a liquid drop. The ink also must be sufficiently stable so as to be free from coagulating in an ink tank or clogging a nozzle and the like. However, none of the conventional ink containing a coloring material insoluble in water such as oil soluble dye is adequate as the ink for ink-jet recording from the standpoints of viscosity and stability.

For example, the ink disclosed in Japanese Laid-Open Patent Publication No. 10-140055 has a viscosity of about 10000 mPa·s, which is too high for use for ink-jet recording. The ink disclosed in Japanese Laid-Open Patent Publication No. 2000-154341 can have a reduced viscosity, but is poor in stability because it is difficult to maintain the dispersion state for a long time. This ink therefore tends to coagulate during storage or clog an ink head.

A solution obtained from the technique described in Polymer Preprints, Japan Vol. 49, No. 1 (2000) pp. 22–24 is high in surface tension and thus low in the speed of penetration into paper. Therefore, when this ink is used for ink-jet recording, a jetted ink drop dries less easily, causing considerable smearing of characters and images formed on the paper with the ink drop. In addition, since the solution is slow in drying, the oil soluble dye is hard to stay on the surface of the paper. The oil soluble dye rather tends to penetrate through the paper to reach the back of the paper, causing so-called strike-through. Duplex printing is therefore difficult.

In view of the above, ink containing an oil soluble dye and yet having low viscosity and high stability has been desired. The object of the present invention is to provide ink for ink-jet recording that exhibits excellent water resistance on ordinary paper, has high stability, smears less easily, enables duplex printing, and provides recorded products with high printing quality and high image quality, and an ink cartridge and a recording apparatus including such ink.

SUMMARY OF THE INVENTION

The ink for ink-jet recording of the present invention contains a coloring material, water, a surface-active material, and an additive composed of a hydrophobic segment that attaches to the coloring material and a hydrophilic segment located outside of said hydrophobic segment, and has a surface tension at 25° C. in a range of 20 to 50 mN/m.

Alternatively, the ink for ink-jet recording of the present invention contains a coloring material, a humectant, a penetrant, water, and an amphiphilic star block polymer of which the outer portion is hydrophilic and the inner portion is hydrophobic, and has a surface tension at 25° C. in a range of 20 to 50 mN/m.

In the ink for ink-jet recording described above, the viscosity at 25° C. is preferably in a range of 1 to 10 mPa·s.

The ink cartridge of the present invention includes ink for ink-jet recording containing a coloring material, a humectant, a penetrant, water, and an amphiphilic star block polymer of which the outer portion is hydrophilic and the inner portion is hydrophobic, and having a surface tension at 25° C. in a range of 20 to 50 mN/m.

The recording apparatus of the present invention includes ink for ink-jet recording containing a coloring material, a humectant, a penetrant, water, and an amphiphilic star block polymer of which the outer portion is hydrophilic and the inner portion is hydrophobic, and having a surface tension at 25° C. in a range of 20 to 50 mN/m. Recording is performed by jetting the ink onto a recording medium.

Alternatively, the ink for ink-jet recording of the present invention contains a coloring material, a humectant, a penetrant, water, and an amphiphilic heteroarm star polymer, and has a surface tension at 25° C. in a range of 20 to 50 mN/m.

In the ink for ink-jet recording described above, the viscosity at 25° C. is preferably in a range of 1 to 10 mPa·s.

Alternatively, the ink cartridge of the present invention includes ink for ink-jet recording containing a coloring material, a humectant, a penetrant, water, and an amphiphilic heteroarm star polymer, and having a surface tension at 25° C. in a range of 20 to 50 mN/m.

Alternatively, the recording apparatus of the present invention includes ink for ink-jet recording containing a coloring material, a humectant, a penetrant, water, and an amphiphilic heteroarm star polymer, and having a surface tension at 25° C. in a range of 20 to 50 mN/m. Recording is performed by jetting the ink onto a recording medium.

According to the present invention, if an oil soluble dye is used as the coloring material, oil soluble dye molecules are captured by hydrophobic segments of an amphiphilic block polymer. The outer portion of the block polymer is hydrophilic and thus the block polymer itself dissolves in water. The oil soluble dye molecules that are captured in the inner portion of the block polymer also dissolve in water via the block polymer. As a result, the viscosity of the ink decreases and the stability improves.

Wherein, the coloring material is not limited to oil soluble dye and may be a coloring material insoluble in water, such as a pigment.

The surface tension of the ink at 25° C. is in the range of 20 to 50 mN/m, which is comparatively low. Therefore, the solvent of the ink, composed of the humectant, the penetrant, and the water, swiftly penetrates into a recording medium after the jetted ink attaches to the recording medium. This makes the ink less smearing. In addition, when the recording medium is paper, the oil soluble dye tends to stay in the surface portion of the paper because the oil soluble dye does not interact with cellulose molecules constituting the paper. The phenomenon of strike-through therefore hardly occurs, and thus duplex printing is possible.

The surface tension of the ink is preferably as small as possible from the standpoint of facilitating the penetration into the paper. However, if the surface tension of the ink is smaller than 20 mN/m, it is difficult to form the ink into a liquid drop when the ink is jetted out. In consideration of this, the surface tension of the ink was set at 20 mN/m or more. It should be noted, therefore, that the surface tension of the ink may be smaller than 20 mN/m if nice ink jetting is attained.

The viscosity of the ink is set at a value in the range of 1 to 10 mPa·s. This provides ink having an especially suitable viscosity for ink-jet recording.

As described above, the ink for ink-jet recording according to the present invention contains an amphiphilic star polymer of which the outer portion is hydrophilic and the inner portion is hydrophobic. The coloring material is captured in the star polymer and thus can be dissolved in water. This suppresses the viscosity to a low level and improves the stability.

The ink cartridge and the recording apparatus according to the present invention include the ink for ink-jet recording described above. Using such ink, it is possible to provide recording with high printing quality, high image quality, and excellent water resistance on ordinary paper.

DESCRIPTION OF THE PREFERRED EMBODIMENTS

Hereinafter, an embodiment of the present invention will be described with reference to the accompanying drawings.

Figure 1:
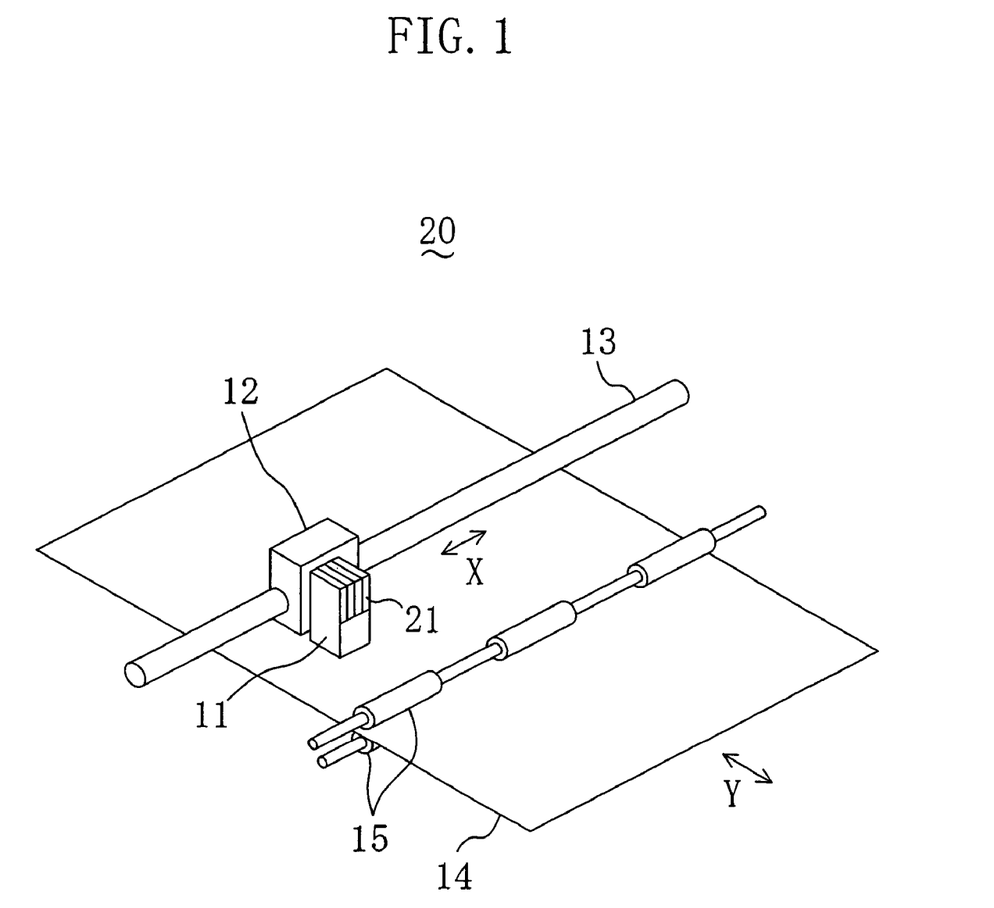
FIG. 1 is a schematic structural view of an ink-jet recording apparatus in an embodiment of the present invention.

FIG. 1 shows a schematic construction of an ink-jet recording apparatus 20 in the embodiment. The recording apparatus 20 jets ink from an ink-jet head 11 to allow the ink to drop on recording paper 14 as a recording medium so that characters or images are formed on the recording paper 14. The ink-jet head 11, which is integrally equipped with an ink cartridge 21 storing ink, is mounted to a carriage 12. The carriage 12 is provided with a carriage motor not shown. With the carriage motor, the carriage 12 is moved forward and backward in the main scanning direction X along a carriage axis 13 that extends in this direction. The carriage 12, the carriage axis 13, and the carriage motor constitute a relative movement means for moving the ink-jet head 11 relatively with respect to the recording paper 14.

The recording paper 14 is sandwiched by a plurality of sets of transport rollers 15, 15 that are rotated with a transport motor not shown, so that the recording paper 14 is transported in the sub-scanning direction Y orthogonal to the main scanning direction X.

The ink-jet head 11 stores ink containing an oil soluble dye as ink for recording. In addition to the oil soluble dye as a coloring material, the ink also contains a humectant such as glycerin for suppressing drying of the ink in the head member, a penetrant such as diethylene glycol monobutyl ether for enhancing penetration of the ink into the recording paper 14, and water. It is noted that the penetrant has a function of lowering the surface tension of the ink and composed of a surface-active material. The humectant, the penetrant, and water constitute the solvent of the ink. The ink further contains a star polymer.

Figure 2:
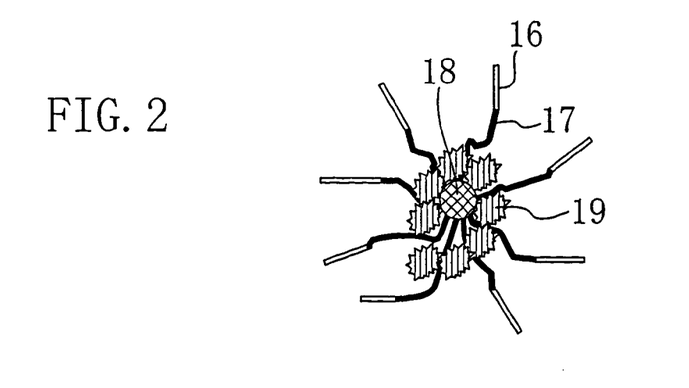
FIG. 2 is a diagrammatic illustration of an amphiphilic star block polymer in the embodiment.
Figure 3:
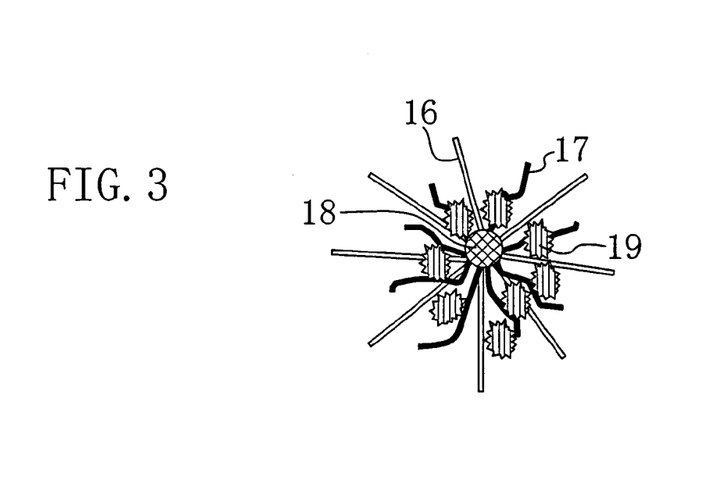
FIG. 3 is a diagrammatic illustration of an amphiphilic heteroarm star polymer in the embodiment.

As schematically shown in FIGS. 2 to 6, various types of star polymers exist. Among these, an amphiphilic star polymer of which the external portion is hydrophilic is contained in the ink in this embodiment. In FIGS. 2 to 6, the reference numeral 16 denotes a hydrophilic segment, 17 denotes a hydrophobic segment, and 18 denotes a microgel. Specifically, the ink in this embodiment contains an amphiphilic star block polymer as shown in FIG. 2 or an amphiphilic heteroarm star polymer as shown in FIG. 3. The reason why the types of star polymers used in this embodiment are limited to these two types is as follows.

When ink contains an amphiphilic star block polymer as shown in FIG. 2 where the hydrophilic segments 16 are located in the outer portion while the hydrophobic segments 17 are located in the inner portion, oil soluble dye molecules 19 are captured by the hydrophobic segments 17. That is, the oil soluble dye molecules 19 are captured in the inner portion of the block polymer. Since the outer portion of the block polymer is hydrophilic, the block polymer itself dissolves in water. As a result, the oil soluble dye molecules 19 captured in the inner portion of the block polymer also dissolve in water via the block polymer. With the existence of such a bock polymer, therefore, the viscosity of the ink decreases (preferably to 1 to 10 mPa·s). In addition, the stability of the ink improves since the oil soluble dye molecules 19 are less likely to aggregate with one another.

Likewise, when ink contains an amphiphilic heteroarm star polymer as shown in FIG. 3 where both the hydrophilic segments 16 and the hydrophobic segments 17 extend from the microgel 18 and the hydrophilic segments 16 are longer than the hydrophobic segments 17, oil soluble dye molecules 19 are captured by the hydrophobic segments 17 in high concentration. Since the outer portion of this star polymer is hydrophilic, the star polymer itself dissolves in water. As a result, in this case, also, the oil soluble dye molecules 19 captured in the inner portion of the star polymer dissolve in water via the star polymer. Therefore, the viscosity of the ink is suppressed low (for example, 1 to 10 mPa·s), and the stability of the ink improves.

Figure 4:
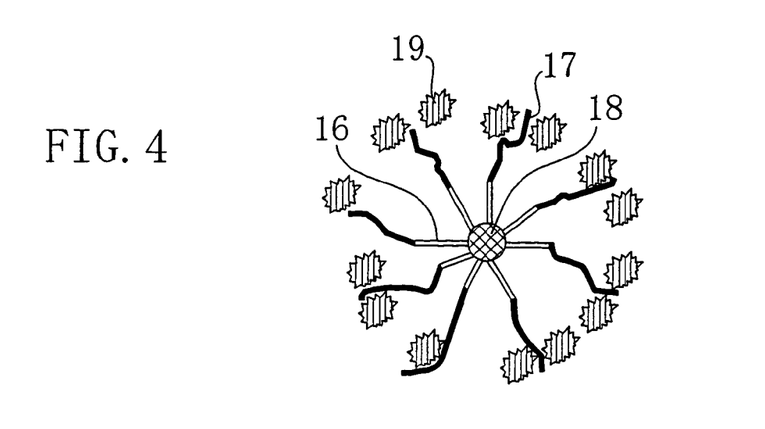
FIG. 4 is a diagrammatic illustration of an amphiphilic star block polymer in a comparative example.

On the contrary, the above effects of reduction in viscosity and improvement in stability are not obtained when an amphiphilic star block polymer as shown in FIG. 4 is used where the hydrophilic segments 16 are located in the inner portion while the hydrophobic segments 17 are located in the outer portion. With this construction, oil soluble dye molecules 19 fail to be captured in the inner portion of the block polymer, and rather exist as weakly bound coalescing masses in the outer portion of the block polymer. In addition, since the outer portion of the block polymer is hydrophobic, the block polymer itself does not dissolve in water.

Figure 5:
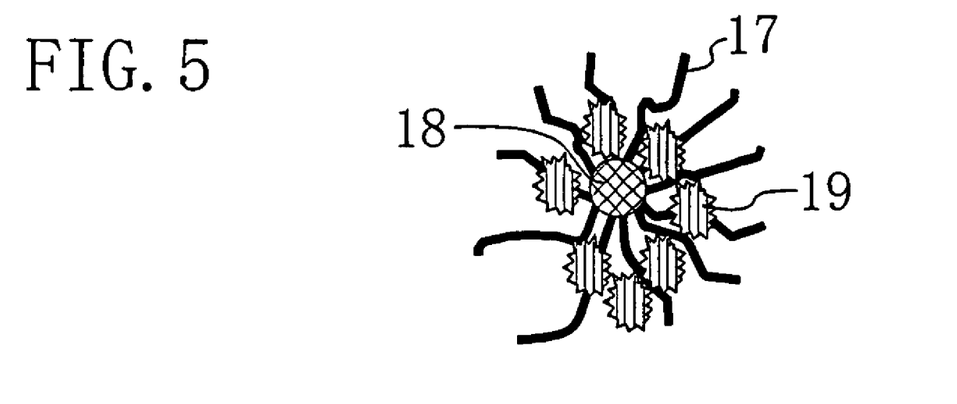
FIG. 5 is a diagrammatic illustration of a block polymer in a comparative example.

The above effects are not obtained either in the case of using a block polymer as shown in FIG. 5 where only the hydrophobic segments 17 extend from the microgel 18. In this case, although oil soluble dye molecules 19 are captured by the hydrophobic segments 17, the block polymer having no hydrophilic segments fails to exhibit hydrophilicity and thus does not dissolve in water.

Figure 6:
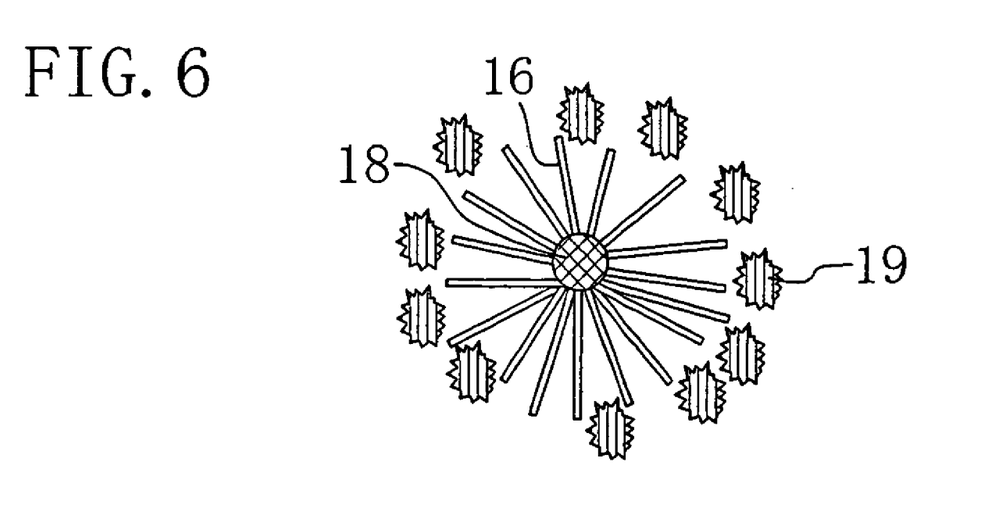
FIG. 6 is a diagrammatic illustration of a block polymer in a comparative example.

In the case of using a block polymer as shown in FIG. 6 where only the hydrophilic segments 16 extend from the microgel 18, the polymer fails to capture oil soluble dye molecules 19 in the inner portion. Therefore, in this case, also, the above effects are not obtained.

For the above reason, an amphiphilic block polymer of which the outer portion is hydrophilic and the inner portion is hydrophobic is selected in the ink in this embodiment.

Figure 7:
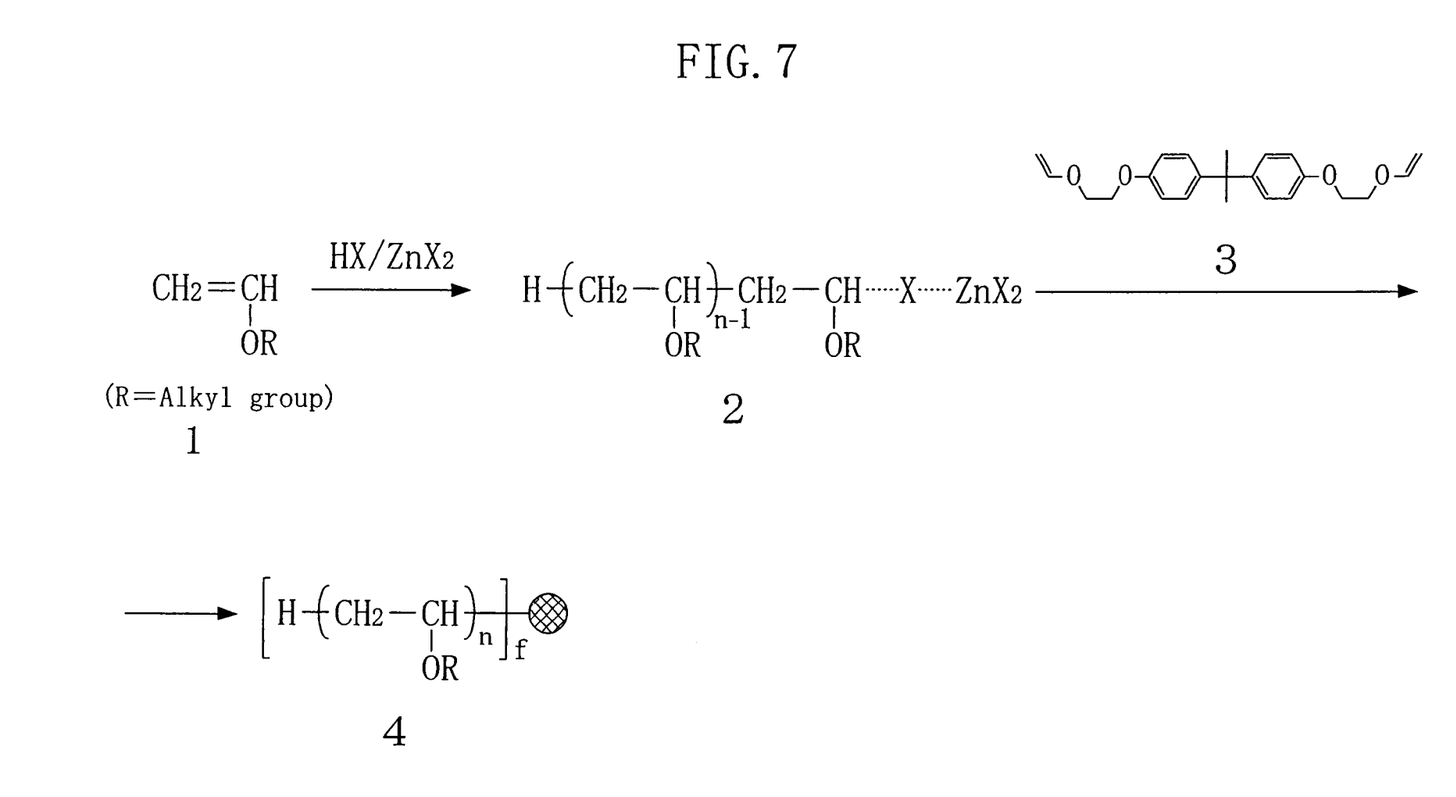
FIG. 7 is a view illustrating a method for synthesizing a block polymer.

Referring to FIG. 7, a block polymer as described above is prepared in the following manner. First, vinyl ether 1 is reacted with $Hx/ZnX_2$ (X=Cl, I) to synthesize a living polymer 2 of polyvinyl ether with alkyl groups as side chains. The living polymer 2 is then reacted with divinyl ether 3 to give a star polymer 4.

Figure 8:
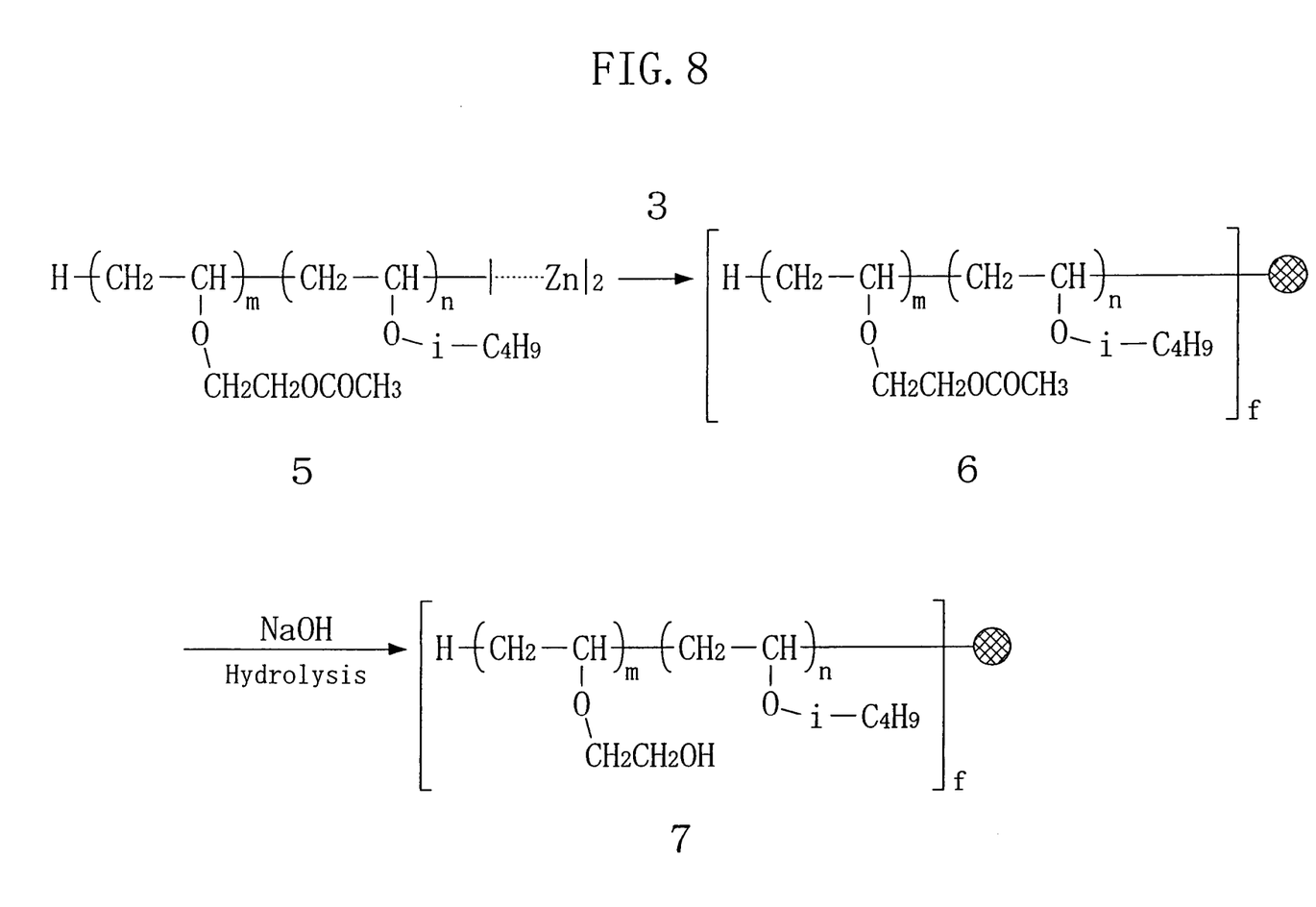
FIG. 8 is a view illustrating a method for synthesizing the amphiphilic star block polymer in the embodiment.

Specifically, the amphiphilic star block polymer of which the outer portion is hydrophilic and the inner portion is hydrophobic can be prepared by a synthesizing method shown in FIG. 8. In this synthesizing method, first, a living block polymer 5 of vinyl ether with ester side chains and alkylvinyl ether is reacted with divinyl ether 3 to give a precursor block polymer 6. The side chains of this polymer are then hydrolyzed to obtain an amphiphilic star block polymer 7 having hydroxyl groups.

Figure 9:
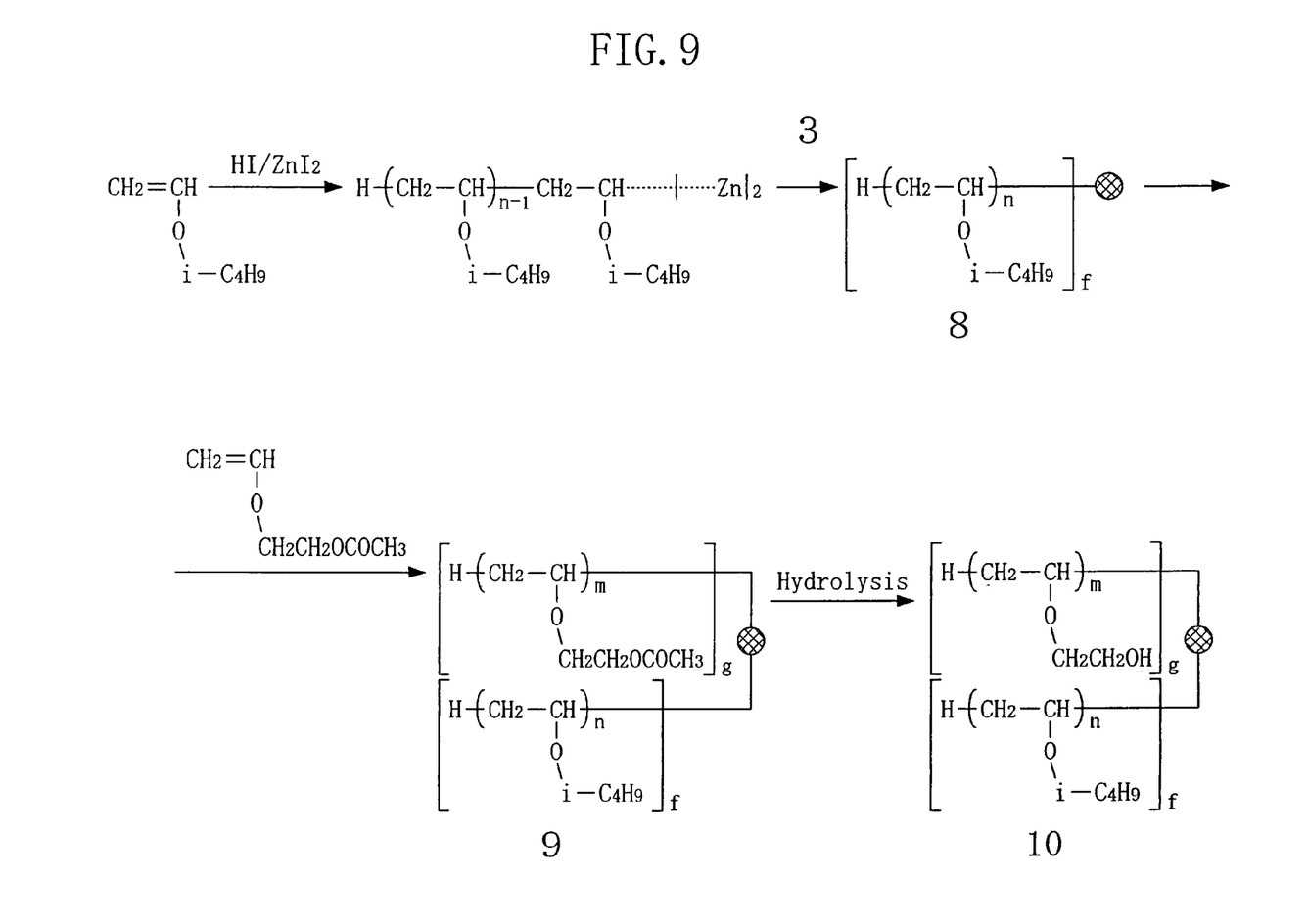
FIG. 9 is a view illustrating a method for synthesizing the amphiphilic heteroarm star polymer in the embodiment.

The amphiphilic heteroarm star polymer can be prepared by a synthesizing method shown in FIG. 9. In this synthesizing method, first, a living block polymer of alkylvinyl ether is reacted with divinyl ether 3 to give a star polymer 8. The star polymer 8 is then reacted with the vinyl ether with ester side chains to give a precursor star polymer 9. The side chains of this polymer are then hydrolyzed to obtain an amphiphilic heteroarm star polymer 10.

Examples of the oil soluble dye contained in the ink include mono-azo dyes, dis-azo dyes, metal complex salt type mono-azo dyes, anthraquinone dyes, phthalocyanine dyes, and triallylmethane dyes. Specifically, it is possible to use one type or two or more types in combination selected from C.I. Solvent Black #3, #5, #7, #22, #23, #27, #29, #34, #123, C.I. Solvent Blue #2, #11, #12, #25, #35, #36, #38, #55, #70, #73, C.I. Solvent Red #1, #3, #8, #23, #24, #25, #27, #30, #49, #81, #82, #83, #84, #100, #109, #118, #121, #122, 121, #122, #132, #179, #218, C.I. Solvent Yellow #2, #6, #14, #15, #16, #19, #21, #33, #45, #56, #61, #77, #80, #82, #149, #151, C.I. Solvent Green #3, C.I. Solvent Orange #1, #2, #6, #14, #37, #40, #44, #45, C.I. Solvent Violet #8, #13, #14, #21, and #27, for example.

EXAMPLES

Hereinafter, specific examples carried out will be described.

First, 21 types of ink for ink-jet recording having the following compositions (shown in mass percentage) were prepared (Examples 1 to 21).

Example 1

| | |
|---|---|
| C.I. Solvent Black #3 | 3% |
| Glycerin | 10% |
| Diethylene glycol monobutyl ether | 10% |
| Amphiphilic star block polymer (Formula 7) | 2% |
| Pure water | 75% |

Example 2

| | |
|---|---|
| C.I. Solvent Blue #2 | 3% |
| Glycerin | 10% |
| Diethylene glycol monobutyl ether | 10% |
| Amphiphilic star block polymer (Formula 7) | 2% |
| Pure water | 75% |

Example 3

| | |
|---|---|
| C.I. Solvent Red #1 | 3% |
| Glycerin | 10% |
| Diethylene glycol monobutyl ether | 10% |
| Amphiphilic star block polymer (Formula 7) | 2% |
| Pure water | 75% |

Example 4

| | |
|---|---|
| C.I. Solvent Yellow #2 | 3% |
| Glycerin | 10% |
| Diethylene glycol monobutyl ether | 10% |
| Amphiphilic star block polymer (Formula 7) | 2% |
| Pure water | 75% |

Example 5

| | |
|---|---|
| C.I. Solvent Black #5 | 3% |
| Glycerin | 10% |
| Diethylene glycol monobutyl ether | 10% |
| Amphiphilic heteroarm star polymer (Formula 10) | 2% |
| Pure water | 75% |

Example 6

| | |
|---|---|
| C.I. Solvent Blue #11 | 3% |
| Glycerin | 10% |
| Diethylene glycol monobutyl ether | 10% |
| Amphiphilic heteroarm star polymer (Formula 10) | 2% |
| Pure water | 75% |

Example 7

| | |
|---|---|
| C.I. Solvent Red #3 | 3% |
| Glycerin | 10% |
| Diethylene glycol monobutyl ether | 10% |
| Amphiphilic heteroarm star polymer (Formula 10) | 2% |
| Pure water | 75% |

Example 8

| | |
|---|---|
| C.I. Solvent Yellow #6 | 3% |
| Glycerin | 10% |
| Diethylene glycol monobutyl ether | 10% |
| Amphiphilic heteroarm star polymer (Formula 10) | 2% |
| Pure water | 75% |

Example 9

| | |
|---|---|
| C.I. Solvent Black #7 | 3% |
| Glycerin | 10% |
| Diethylene glycol monobutyl ether | 10% |
| Amphiphilic star block polymer (obtained by substituting an n-hexyl group for the isopropyl group of the block polymer in Formula 7) | 2% |
| Pure water | 75% |

Example 10

| | |
|---|---|
| C.I. Solvent Blue #12 | 3% |
| Glycerin | 10% |
| Diethylene glycol monobutyl ether | 10% |
| Amphiphilic star block polymer (obtained by substituting an n-hexyl group for the isopropyl group of the block polymer in Formula 7) | 2% |
| Pure water | 75% |

Example 11

| | |
|---|---|
| C.I. Solvent Red #8 | 3% |
| Glycerin | 10% |
| Diethylene glycol monobutyl ether | 10% |
| Amphiphilic star block polymer (obtained by substituting an n-hexyl group for the isopropyl group of the block polymer in Formula 7) | 2% |
| Pure water | 75% |

Example 12

| | |
|---|---|
| C.I. Solvent Yellow #14 | 3% |
| Glycerin | 10% |
| Diethylene glycol monobutyl ether | 10% |
| Amphiphilic star block polymer (obtained by substituting an n-hexyl group for the isopropyl group of the block polymer in Formula 7) | 2% |
| Pure water | 75% |

Example 13

| | |
|---|---|
| C.I. Solvent Black #22 | 3% |
| Glycerin | 10% |
| Diethylene glycol monobutyl ether | 10% |
| Amphiphilic heteroarm star polymer (obtained by substituting an n-hexyl group for the isopropyl group of the star polymer in Formula 10) | 2% |
| Pure water | 75% |

Example 14

| | |
|---|---|
| C.I. Solvent Blue #25 | 3% |
| Glycerin | 10% |
| Diethylene glycol monobutyl ether | 10% |
| Amphiphilic heteroarm star polymer (obtained by substituting an n-hexyl group for the isopropyl group of the star polymer in Formula 10) | 2% |
| Pure water | 75% |

Example 15

| | |
|---|---|
| C.I. Solvent Red #23 | 3% |
| Glycerin | 10% |
| Diethylene glycol monobutyl ether | 10% |
| Amphiphilic heteroarm star polymer (obtained by substituting an n-hexyl group for the isopropyl group of the star polymer in Formula 10) | 2% |
| Pure water | 75% |

Example 16

| | |
|---|---|
| C.I. Solvent Yellow #15 | 3% |
| Glycerin | 10% |
| Diethylene glycol monobutyl ether | 10% |
| Amphiphilic heteroarm star polymer (obtained by substituting an n-hexyl group for the isopropyl group of the star polymer in Formula 10) | 2% |
| Pure water | 75% |

Example 17

| | |
|---|---|
| C.I. Solvent Black #3 | 3% |
| Glycerin | 10% |
| Diethylene glycol monobutyl ether | 20% |
| Amphiphilic star block polymer (Formula 7) | 2% |
| Pure water | 65% |

Example 18

| | |
|---|---|
| C.I. Solvent Black #3 | 3% |
| Glycerin | 10% |
| Diethylene glycol monobutyl ether | 30% |
| Amphiphilic star block polymer (Formula 7) | 2% |
| Pure water | 55% |

Example 19

| | |
|---|---|
| C.I. Solvent Black #3 | 3% |
| Glycerin | 10% |
| Diethylene glycol monobutyl ether | 10% |
| Amphiphilic star block polymer (Formula 7) | 2% |
| Fluorine surfactant (product name "FC-93" available from 3M Ltd.) | 1% |
| Pure water | 74% |

Example 20

| | |
|---|---|
| C.I. Solvent Black #3 | 3% |
| Glycerin | 10% |
| Diethylene glycol monobutyl ether | 5% |
| Amphiphilic star block polymer (Formula 7) | 2% |
| Pure water | 80% |

Example 21

| | |
|---|---|
| C.I. Solvent Black #3 | 3% |
| Glycerin | 10% |
| Diethylene glycol monobutyl ether | 2% |
| Amphiphilic star block polymer (Formula 7) | 2% |
| Pure water | 83% |

Using the respective types of ink for ink-jet recording described above, recording was performed on ordinary paper (product name "Xerox 4024" available from Xerox Corp.) with a commercially available printer. The resultant recorded products exhibited high printing quality and high image quality free from smearing of characters and images. There was no occurrence of strike-through of ink, and clear characters and images were obtained even when duplex printing was performed.

The recorded paper sheets were immersed in pure water and then dried by leaving them at room temperature. The state of the ink after the drying was observed (water resistance test). As a result, no smearing was observed for any types of ink in Examples 1 to 21. It was therefore confirmed that these types of ink had high water resistance.

In addition, the types of ink in examples 1 to 21 were left in an atmosphere of 70° C. for three months, and then the state of ink was observed (stability test). As a result, no coagulation/precipitation was observed in any types of ink. It was therefore confirmed that the types of ink in Examples 1 to 21 had high stability.

For comparison, smearing of ink, jetting performance, stability, and the like were examined for conventional types of ink in Comparative Example 1 (see Japanese Laid-Open Patent Publication No. 10-140055), Comparative Example 2 (see Japanese Laid-Open Patent Publication No. 2000-154341), and Comparative Example 3 (see Polymer Preprints, Japan Vol. 49, No. 1 (2000) pp. 22–24).

Comparative Example 1

| | |
|---|---|
| C.I. Solvent Black #27 | 4% |
| Styrene-acrylic acid copolymer | 11% |
| Polyetherpolyol water-soluble acrylic resin emulsion of polyoxyethylene oxypropylene block copolymer having a number-average degree of polymerization of oxyethylene of 60 and that of oxypropylene of 45 and glycerin | 74% |
| Water-soluble acrylic resin emulsion (JOHNCRYL J-61 available from Johnson Polymer Co.) | 6% |
| Triethylene glycol monobutyl ether | 5% |

Comparative Example 2

Ink in Comparative Example 2 was prepared in the following manner. First, 2 g of dodecyl sodium sulfate, 4 g of New Frontier S510, 194 g of deionized water, and 10 g of n-butoxymethylacrylamide were put in a flask, and the temperature of the liquid was raised to 50° C. while stirring under nitrogen gas flow. Thereafter, 5 g of an ethanol solution containing 0.5 g of V-70 (oil-soluble azo polymerization initiator, available from Wako Pure Chemical Industries, Ltd.) was poured in the flask, and subsequently a monomer solution having the following composition was dropped over two hours. The resultant solution was stirred at the same temperature for four hours and then cooled to room temperature, to obtain ink of a colored resin emulsion (ink in Comparative Example 2).

Composition of the Monomer Solution:

| | |
|---|---|
| n-butoxymethylacrylamide | 89 g |
| Ethyleneglycol dimethyl methacrylate | 1 g |
| Savinyl Blue GLS (phthalocyanine blue dye available from Clariant Corp.) | 6.3 g |
| Savinyl Blue RS (anthraquinone blue dye available from Clariant Corp.) (Comparative Example 3) | 18.7 g |
| C.I. Solvent Red #27 | 3% |
| Amphiphilic star block polymer (Formula 7) | 2% |
| Pure water | 95% |

As for the ink in Comparative Example 1, the viscosity at 25° C. was as high as 9800 mPa·s. Using this ink, therefore, printing was not possible with a commercially available ink-jet printer.

As for the ink in Comparative Example 2, the viscosity at 25° C. was 5 mPa·s immediately after the preparation of the ink. At this time, printing was possible with a commercially available ink-jet printer. However, when the printer was operated again after being left standing for 24 hours, no jet of the ink was obtained. The ink in Comparative Example 2 was also put in a sealed container and left standing in an atmosphere of 70° C. for three weeks. As a result, the ink was partly coagulated, and the viscosity increased to 1000 mPa·s.

As for the ink in Comparative Example 3, characters and images printed with a commercially available ink-jet printer using this ink were smeared, making the recorded product totally unrecognizable. In addition, the phenomenon of strike-through of the ink occurred.

In view of the above, unlike the types of ink in Examples 1 to 21, the types of ink in Comparative Examples 1 to 3 described above are found unsuitable for ink-jet recording.

Table 1 below shows the results of measurements of surface tension and viscosity of the types of ink in Examples 1 to 21 and Comparative Examples 1 to 3. From this table, also, it is found that the types of ink in Examples 1 to 21 are suitable for ink-jet recording.

The solvent of the ink of the present invention preferably has a surface tension in the range of 20 to 50 mN/m. Table 1 also shows the surface tension of the solvent of the ink.

TABLE 1

| | Surface tension (ink) (mN/m, 25° C.) | Viscosity (ink) (cP, 25° C.) | Surface tension (solvent) (mN/m, 25° C.) |
|---|---|---|---|
| Example 1 | 34 | 3.1 | 36 |
| Example 2 | 35 | 3.9 | 36 |
| Example 3 | 34.5 | 3.5 | 36 |
| Example 4 | 33 | 3.2 | 36 |
| Example 5 | 33.5 | 3.6 | 36 |
| Example 6 | 34 | 3.3 | 36 |
| Example 7 | 34.5 | 3.7 | 36 |
| Example 8 | 34 | 3.4 | 36 |
| Example 9 | 34.5 | 3.4 | 36 |
| Example 10 | 33 | 3.5 | 36 |
| Example 11 | 33.5 | 3.2 | 36 |
| Example 12 | 34 | 3.6 | 36 |
| Example 13 | 34.5 | 3.3 | 36 |
| Example 14 | 34 | 3.7 | 36 |
| Example 15 | 33 | 3.1 | 36 |
| Example 16 | 33.5 | 3.9 | 36 |
| Example 17 | 31 | 3.6 | 33 |
| Example 18 | 29 | 3.3 | 30 |
| Example 19 | 22 | 3.7 | 24 |
| Example 20 | 39 | 3.4 | 41 |
| Example 21 | 48 | 3.2 | 50 |
| Comparative Example 1 | 33 | 9800 | 34 |
| Comparative Example 2 | 31 | 5 | 29 |
| Comparative Example 3 | 61 | 1.5 | 72 |

The present invention is not limited to the embodiment described above, but may be carried out in various ways without departing from the spirit or the main features of the invention.

In the above embodiments, an oil soluble dye is exemplifed as a coloring material. However, the coloring material is not limited to this kind and may be a pigment. In this case, the pigment is captured by the hydrophobic segments of amphiphilic block polymer in FIG. 2. Since the outer portion of the block polymer is hydrophilic, the block polymer itself dissolves in water. As a result, the pigment captured in the inner portion of the block polymer also dissolves in water via the block polymer. With the existence of such a block polymer, the viscosity of the ink decreases (preferably to 1 to 10 mPa·s). Further, the stability of the ink improves since the pigment is less likely to aggregate.

Even when ink contains an amphiphilic heteroarm star polymer as shown in FIG. 3 where the hydrophilic segments 16 are longer than the hydrophobic segments 17, the pigment is captured by the hydrophobic segments 17 in high concentration. Since the outer portion of the star polymer is hydrophilic, the star polymer itself dissolves in water. As a result, in this case, also, the pigment captured in the inner portion of the star polymer also dissolves in water via the star polymer. Therefore, the viscosity of the ink is suppressed (for example, 1 to 10 mPa·s) and the stability of the ink improves.

The surface-active material for decreasing the surface tension of the ink is not limited to those exemplified in the embodiments, and various kinds of surface-active materials can be used. The surface-active material may be selected according to a kind of coloring material and the like, and various kinds of materials can be utilized such as a water-soluble organic solution, a surfactant.

The present embodiment described above is merely illustrative and should not be construed as restrictive. The scope of the present invention is determined solely by the appended claims, and by no means restricted by the foregoing description. All modifications and changes that fall within meets and bounds of the claims or the equivalence of such meets and bounds are intended to be embraced by the claims.

What is claimed is:

1. An ink for ink-jet recording containing oil-soluble dye, a humectant, a penetrant, water, and an amphiphilic star block polymer comprising a core and arms, the surface tension of the ink at 25° C. being in a range of 20 to 50 mN/m,
    wherein each of said arms has a hydrophobic segment and a hydrophilic segment, the hydrophilic segment is located at the end of the arm farthest from the core, and the hydrophilic segment is obtained by hydrolyzing vinyl ether having ester side chains.

2. The ink of claim 1, wherein the viscosity at 25° C. is in a range of 1 to 10 mPa s.

3. An ink cartridge including ink for ink-jet recording, the ink containing oil-soluble dye, a humectant, a penetrant, water, and an amphiphilic star block polymer comprising a core and arms, the surface tension of the ink at 25° C. being in a range of 20 to 50 mN/m, wherein each of said arms has a hydrophobic segment and a hydrophilic segment, the hydrophilic segment is located at the end of the arm farthest from the core, and the hydrophilic segment is obtained by hydrolyzing vinyl ether having ester side chains.

4. A recording apparatus including ink for ink-jet recording, the ink containing oil-soluble dye, a humectant, a penetrant, water, and an amphiphilic star block polymer comprising a core and arms, the surface tension of the ink at 25° C. being in a range of 20 to 50 mN/m, wherein each of said arms has a hydrophobic segment and a hydrophilic segment, the hydrophilic segment is located at the end of the arm farthest from the core, the hydrophilic segment is obtained by hydrolyzing vinyl ether having ester side chains, and recording is performed by jetting the ink onto a recording medium.

5. An ink for ink-jet recording containing oil-soluble dye, a humectant, a penetrant, water, and an amphiphilic heteroarm star polymer, the surface tension of the ink at 25° C. being in a range of 20 to 50 mN/m, wherein the amphiphilic heteroarm star polymer has a hydrophobic segment and a hydrophilic segment, the hydrophilic segment is obtained by hydrolyzing vinyl ether having ester side chains, and the star polymer dissolves the oil-soluble dye in the ink composition.

6. The ink of claim 5, wherein the viscosity at 25° C. is in a range of 1 to 10 mPa·s.

7. An ink cartridge including ink for ink-jet recording, the ink containing oil-soluble dye, a humectant, a penetrant, water, and an amphiphilic heteroarm star polymer, the surface tension of the ink at 25° C. being in a range of 20 to 50 mN/m, wherein the amphiphilic heteroarm star polymer has a hydrophobic segment and a hydrophilic segment, the hydrophilic segment is obtained by hydrolyzing vinyl ether having ester side chains, and the star polymer dissolves the oil-soluble dye in the ink composition.

8. A recording apparatus including ink for ink-jet recording, the ink containing oil-soluble dye, a humectant, a penetrant, water, and an amphiphilic heteroarm star polymer, the surface tension of the ink at 25° C. being in a range of 20 to 50 mN/m, wherein recording is performed by jetting the ink onto a recording medium, the amphiphilic heteroarm star polymer has a hydrophobic segment and a hydrophilic segment, the hydrophilic segment is obtained by hydrolyzing vinyl ether having ester side chains, and the star polymer dissolves the oil-soluble dye in the ink composition.

9. An ink for ink-jet recording containing oil-soluble dye, water, a surface-active material, and an additive composed of a hydrophobic segment that attaches to said oil-soluble dye and a hydrophilic segment located outside of said hydrophobic segment, the surface tension of the ink at 25° C. being in a range of 20 to 50 mN/m, wherein the hydrophilic segment is obtained by hydrolyzing vinyl ether having ester side chains.

* * * * *

UNITED STATES PATENT AND TRADEMARK OFFICE
CERTIFICATE OF CORRECTION

| | | |
|---|---|---|
| PATENT NO. | : 7,160,934 B2 | Page 1 of 1 |
| APPLICATION NO. | : 10/622030 | |
| DATED | : January 9, 2007 | |
| INVENTOR(S) | : Mamoru Soga et al. | |

It is certified that error appears in the above-identified patent and that said Letters Patent is hereby corrected as shown below:

<u>Col. 13, Line 2, Claim 2</u>

"10 mPa s" should be -- 10 mPa • s --

Signed and Sealed this

Third Day of April, 2007

JON W. DUDAS
*Director of the United States Patent and Trademark Office*